US012737467B2

(12) United States Patent
Ko et al.

(10) Patent No.: US 12,737,467 B2
(45) Date of Patent: Sep. 15, 2026

(54) METHOD AND SYSTEM FOR DYNAMIC APPLICATION OF STORAGE ENCRYPTION

(71) Applicant: NAVER Cloud Corp., Seongnam-si (KR)

(72) Inventors: Takkyun Ko, Seongnam-si (KR); Jung Joon Yoon, Seongnam-si (KR)

(73) Assignee: NAVER CLOUD CORP, Seongnam-si (KR)

( * ) Notice: Subject to any disclaimer, the term of this patent is extended or adjusted under 35 U.S.C. 154(b) by 393 days.

(21) Appl. No.: 17/154,156

(22) Filed: Jan. 21, 2021

(65) Prior Publication Data

US 2021/0224393 A1 Jul. 22, 2021

(30) Foreign Application Priority Data

Jan. 22, 2020 (KR) ........................ 10-2020-0008675

(51) Int. Cl.

| | |
|---|---|
| ***G06F 21/00*** | (2013.01) |
| ***G06F 9/455*** | (2018.01) |
| ***G06F 21/57*** | (2013.01) |
| ***G06F 21/60*** | (2013.01) |
| ***H04L 9/08*** | (2006.01) |

(52) U.S. Cl.

CPC ........ *G06F 21/575* (2013.01); *G06F 9/45558* (2013.01); *G06F 21/602* (2013.01); *H04L 9/0822* (2013.01); *G06F 2009/45575* (2013.01); *G06F 2221/2113* (2013.01); *G06F 2221/2141* (2013.01)

(58) Field of Classification Search

CPC .. G06F 21/575; G06F 9/45558; G06F 21/602; G06F 2009/45575; G06F 2221/2113; G06F 2221/2141; H04L 9/0822

See application file for complete search history.

(56) References Cited

U.S. PATENT DOCUMENTS

| | | | | |
|---|---|---|---|---|
| 9,182,982 | B1 * | 11/2015 | Tambat | G06F 9/4406 |
| 9,626,166 | B1 * | 4/2017 | Alewine | G06F 8/63 |
| 9,892,265 | B1 * | 2/2018 | Tripathy | G06F 21/602 |
| 10,491,568 | B1 * | 11/2019 | Roth | H04L 9/0894 |
| 10,834,081 | B2 * | 11/2020 | Pieczul | H04L 63/126 |
| 2014/0164792 | A1 * | 6/2014 | Nord | H04L 9/0822 713/193 |
| 2015/0220745 | A1 * | 8/2015 | Nellitheertha | G06F 21/602 713/193 |
| 2017/0279797 | A1 * | 9/2017 | Cross, Jr. | G06F 21/6218 |
| 2017/0288863 | A1 * | 10/2017 | Dimitrakos | H04L 9/0866 |
| 2018/0060180 | A1 * | 3/2018 | Tan | G06F 16/113 |
| 2018/0295105 | A1 * | 10/2018 | Feng | H04L 9/3226 |
| 2021/0089662 | A1 * | 3/2021 | Muniswamy-Reddy | G06F 9/45533 |
| 2021/0200881 | A1 * | 7/2021 | Joshi | G06F 21/6218 |
| 2022/0365807 | A1 * | 11/2022 | Ahmed | G06F 11/1484 |

* cited by examiner

*Primary Examiner* — Kevin Ayala

(74) *Attorney, Agent, or Firm* — Greer, Burns & Crain, Ltd

(57) ABSTRACT

An encryption setting application method may include acquiring a virtual machine image including a script that describes a hooking operation of a booting process and an encryption setting operation; hooking the booting process based on the hooking operation after booting of a virtual machine starts; applying an encryption setting to the virtual machine based on the encryption setting operation; and restarting the booting process of the virtual machine.

11 Claims, 7 Drawing Sheets case encryption setting apply VM:
if encryption setting is not applied
goto 1
else
goto 2

1
641-1 Start logging
641-2 Copy initramfs
641-3 Generate key
641-4 Apply LUKS
641-5 Store encrypted key file
641-6 Back up LUKS header and key file
641-7 Terminate logging 2
642-1 Start logging
642-2 Decrypt key file
642-3 Open LUKS
642-4 Terminate logging

METHOD AND SYSTEM FOR DYNAMIC APPLICATION OF STORAGE ENCRYPTION

CROSS-REFERENCE TO RELATED APPLICATION(S)

This U.S. non-provisional application claims the benefit of priority under 35 U.S.C. § 119 to Korean Patent Application No. 10-2020-0008675 filed on Jan. 22, 2020, in the Korean Intellectual Property Office (KIPO), the entire contents of which are incorporated herein by reference.

BACKGROUND OF THE INVENTION

Field of Invention

One or more example embodiments of the following description relate to a method and a system for dynamic application of storage encryption.

Description of Related Art

In the case of storing data using virtualization resources in a cloud environment, the data needs to be encrypted for data protection. In general, a scheme of encrypting a disk of a Linux™ system employs Device Mapper (DM) encryption submodule (hereinafter, 'dm-crypt') and Linux™ Unified Key Setup (LUKS) techniques that perform encryption and decryption between a file system and a physical disk. Here, a DM refers to a module that is in charge of mapping between a physical disk and a virtual disk and enables a process side to recognize the physical disk as a single logical volume. Also, 'dm-crypt' may refer to a module configured to process encryption and decryption between a file system and a physical disk, such as, for example, a submodule configured to encrypt a disk using a crypto API in a DM of a Linux™ kernel. Also, LUKS may interact with dm-crypt of Linux™ or BitLocker™ of Windows™ as a key setup solution interacting with various encryption techniques. In the case of Linux™, functions of dm-crypt and LUKS may be used by installing a package called 'cryptsetup'. Basically, the LUKS may perform encryption with respect to a block apparatus that is a dm-crypt standard and may also apply to a partition or a directory based on settings.

To apply, to a disk, encryption using the above dm-crypt and LUKS techniques, a set up to a series of encryption format needs to be performed by initially cleaning up existing data and then inserting encryption setting information into the disk. As described above, to apply dm-crypt and LUKS techniques to a basic disk, for example, a booting disk, of a Linux™ system, the existing data needs to be deleted from the disk. Therefore, it is general to apply an encryption setting at a time of initially installing an operating system (OS). Accordingly, in the case of a cloud service that provides a virtualization server by producing in advance a preset virtual machine image, it may be difficult to apply a disk encryption setting to the virtualization server.

BRIEF SUMMARY OF THE INVENTION

One or more example embodiments provide a method and a system for dynamically applying an encryption setting for a virtual machine without deleting existing data in a booting process of loading a file system when generating the virtual machine using a preset image.

According to an aspect of at least one example embodiment, there is provided an encryption setting application method executed by at least one processor of a computer apparatus. The method includes acquiring a virtual machine image including a script that describes a hooking operation of a booting process and an encryption setting operation; hooking the booting process based on the hooking operation after booting of a virtual machine starts; applying an encryption setting to the virtual machine based on the encryption setting operation; and restarting the booting process.

The applying of the encryption setting to the virtual machine may include copying, to a memory included in the computer apparatus, an initial file system that is temporarily loaded to a physical storage before loading an actual file system of the virtual machine; initializing the physical storage and applying the encryption setting; and restoring the initial file system copied to the memory to the physical storage.

The initializing of the physical storage and the applying of the encryption setting may include generating a first key to be used to encrypt data of the physical storage; constructing a header of a Linux™ Unified Key Setup (LUKS) using the generated first key and applying the LUKS to a system root; generating a key file by encrypting the first key using a second key of an owner of the virtual machine; and storing the generated key file on a local storage.

The applying of the encryption setting to the virtual machine may include, in response to the encryption setting being already applied to the virtual machine, decrypting the key file using the second key of the owner of the virtual machine; and opening the LUKS using the decrypted key file.

The virtual machine image may further include a code for a remote access function, and the method may further include, by the at least one processor, setting communication with a key management service that manages a key of an owner of the virtual machine based on the remote access function.

The applying of the encryption setting to the virtual machine may include acquiring the key of the owner from the key management service.

The setting of the communication with the key management service may include using an access control list (ACL) of a secure shell (SSH)-based public key registration scheme based on the remote access function.

The script may be included in an initial system module included in the virtual machine image to execute an initial system service for consistency of Linux™ kernel initialization.

According to an aspect of at least one example embodiment, there is provided a non-transitory computer-readable record medium storing instructions that, when executed by a processor, cause the processor to perform the encryption setting application method.

According to an aspect of at least one example embodiment, there is provided a computer apparatus including at least one processor configured to execute computer-readable instructions. The at least one processor is configured to acquire a virtual machine image including a script that describes a hooking operation of a booting process and an encryption setting operation, hook the booting process based on the hooking operation after booting of a virtual machine starts, apply an encryption setting to the virtual machine based on the encryption setting operation, and restart the booting process.

According to some example embodiments, when generating a virtual machine using a preset image, it is possible to dynamically apply an encryption setting for the virtual machine without deleting existing data in a booting process of loading a file system.

Further regions of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein.

Figure 1:
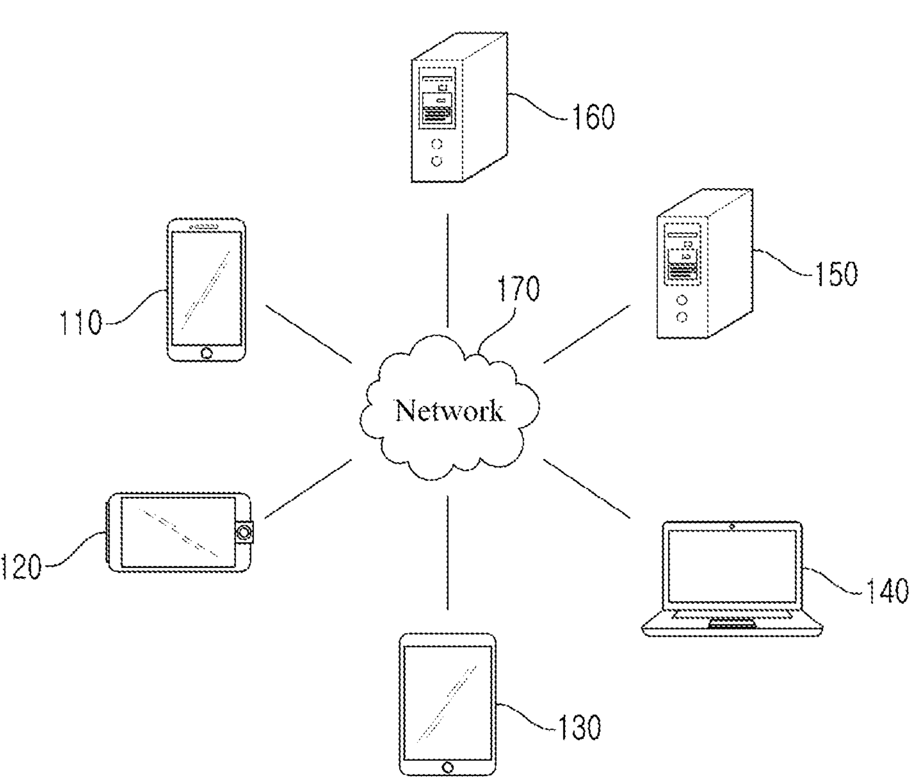
FIG. 1 is a diagram illustrating a network environment according to an example embodiment.

It should be noted that these figures are intended to illustrate the general characteristics of methods and/or a structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION OF THE INVENTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices or processors may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

An encryption setting application system according to example embodiments may be implemented by at least one computer apparatus, and an encryption setting application method according to the example embodiments may be performed through at least one computer apparatus included in the encryption setting application system. A computer program according to an example embodiment may be installed and executed on the computer apparatus and the computer apparatus may perform the encryption setting application method according to the example embodiments under the control of the executed computer program. The computer program may be stored in a non-transitory computer-readable recording medium to computer-implement the encryption setting application method in conjunction with the computer apparatus.

FIG. 1 illustrates an example of a network environment according to at least one example embodiment. Referring to FIG. 1, the network environment may include a plurality of electronic devices 110, 120, 130, 140, a plurality of servers 150, 160, and a network 170. FIG. 1 is provided as an example only. A number of electronic devices or a number of servers is not limited thereto. Also, the network environment of FIG. 1 is provided as one example among environments applicable to the example embodiments and an environment applicable to the example embodiments is not limited to the network environment of FIG. 1.

Each of the plurality of electronic devices 110, 120, 130, 140 may be a fixed terminal or a mobile terminal that is configured as a computer apparatus. For example, the plurality of electronic devices 110, 120, 130, 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer apparatuses capable of communicating with other electronic devices 120, 130, 140, and/or the servers 150, 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and Internet. Also, the network 170 may include at least one of network topologies that include a bus network, a star network, a ring network, a mesh network, a star-bus network, a tree or hierarchical network, and the like. However, they are provided as examples only.

Each of the servers 150, 160 may be configured as a computer apparatus or a plurality of computer apparatuses that provides an instruction, a code, a file, content, a service, etc., through communication with the plurality of electronic devices 110, 120, 130, 140 over the network 170. For example, the server 150 may be a system that provides a service to the plurality of electronic devices 110, 120, 130, 140 connected over the network 170. For example, the service may include a storage service, a content providing service, a group call service or an audio conferencing service, a messaging service, a mail service, a social network service, a map service, a translation service, a financial service, a payment service, and a search service.

Figure 2:
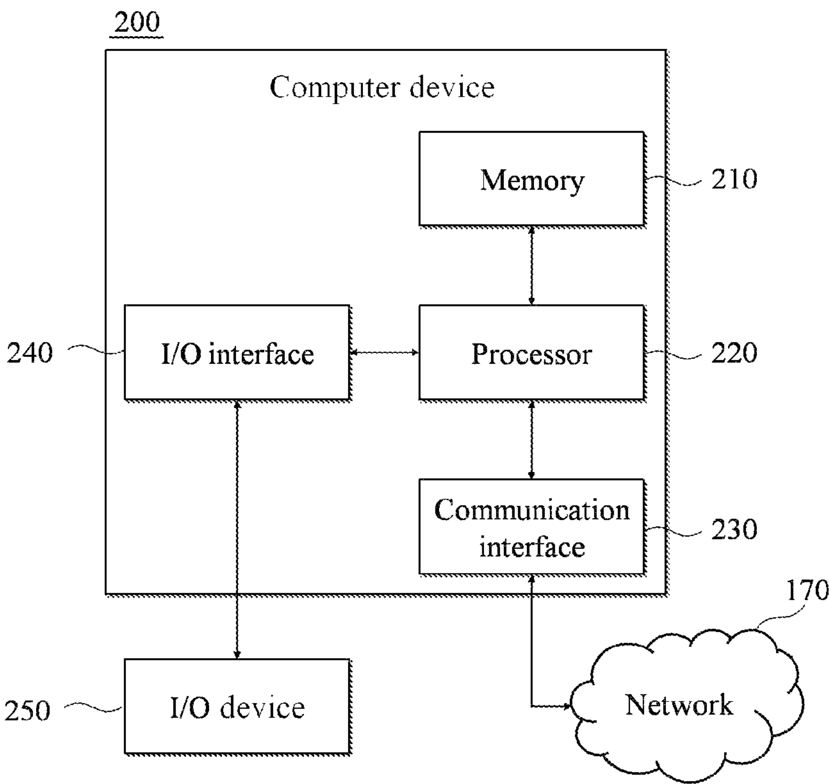
FIG. 2 is a diagram illustrating a computer apparatus according to an example embodiment.

FIG. 2 is a diagram illustrating an example of a computer apparatus according to an example embodiment. Each of the plurality of electronic devices 110, 120, 130, 140 or each of the servers 150, 160 may be implemented by a computer apparatus 200 of FIG. 2.

Referring to FIG. 2, the computer apparatus or device 200 may include a memory 210, a processor 220, a communication interface 230, and an input/output (I/O) interface 240. The memory 210 may include a permanent mass storage device, such as a random access memory (RAM), a read only memory (ROM), and a disk drive, as a non-transitory computer-readable storage medium. A permanent mass storage device, such as ROM and a disk drive, may also be included in the computer apparatus 200 separate from the memory 210. Also, an OS and at least one program code may be stored in the memory 210. Such software components may be loaded to the memory 210 from another non-transitory computer-readable storage medium separate from the memory 210. The other non-transitory computer-readable storage medium may include, for example, a floppy drive, a disk, a tape, a DVD/CD-ROM drive, a memory card, etc. According to other example embodiments, software components may be loaded to the memory 210 through the communication interface 230, instead of, or in addition to, the non-transitory computer-readable storage medium. For example, software components may be loaded to the memory 210 of the computer apparatus 200 based on a computer program installed by files received over a network 170.

The processor 220 may be configured to process computer-readable instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to a program code stored in a storage device, such as the memory 210.

The communication interface 230 may provide a function for communication between the computer apparatus 200 and another apparatus, for example, the aforementioned storage devices, over the network 170. For example, the processor 220 of the computer apparatus 200 may transfer a request or an instruction created based on the program code stored in the storage device, such as the memory 210, data, a file, etc., to other devices over the network 170 the under control of the communication interface 230. Inversely, a signal, an instruction, data, a file, etc., from another apparatus may be received at the computer apparatus 200 through the communication interface 230 of the computer apparatus 200 by going through the network 170. For example, a signal, an instruction, data, etc., received through the communication interface 230 may be transferred to the processor 220 or the memory 210, and a file, etc., may be stored in a storage medium, for example, the permanent storage device, further includable in the computer apparatus 200.

The I/O interface 240 may be a device for interfacing with an I/O device 250. For example, an input device of the I/O device 250 may include a device, such as a microphone, a keyboard, a camera, and a mouse, and an output device of the I/O device 250 may include a device, such as a display and a speaker. As another example, the I/O interface 240 may be a device for interfacing with an apparatus in which an input function and an output function are integrated into a single function, such as a touchscreen. The I/O device 250 may be configured as a single device with the computer apparatus 700.

According to other example embodiments, the computer apparatus 200 may include a number of components greater than or less than the number of components shown in FIG. 2. For example, the computer apparatus 200 may be configured to include at least a portion of the I/O device 250 or may further include other components, such as a transceiver and a database.

Figure 3:
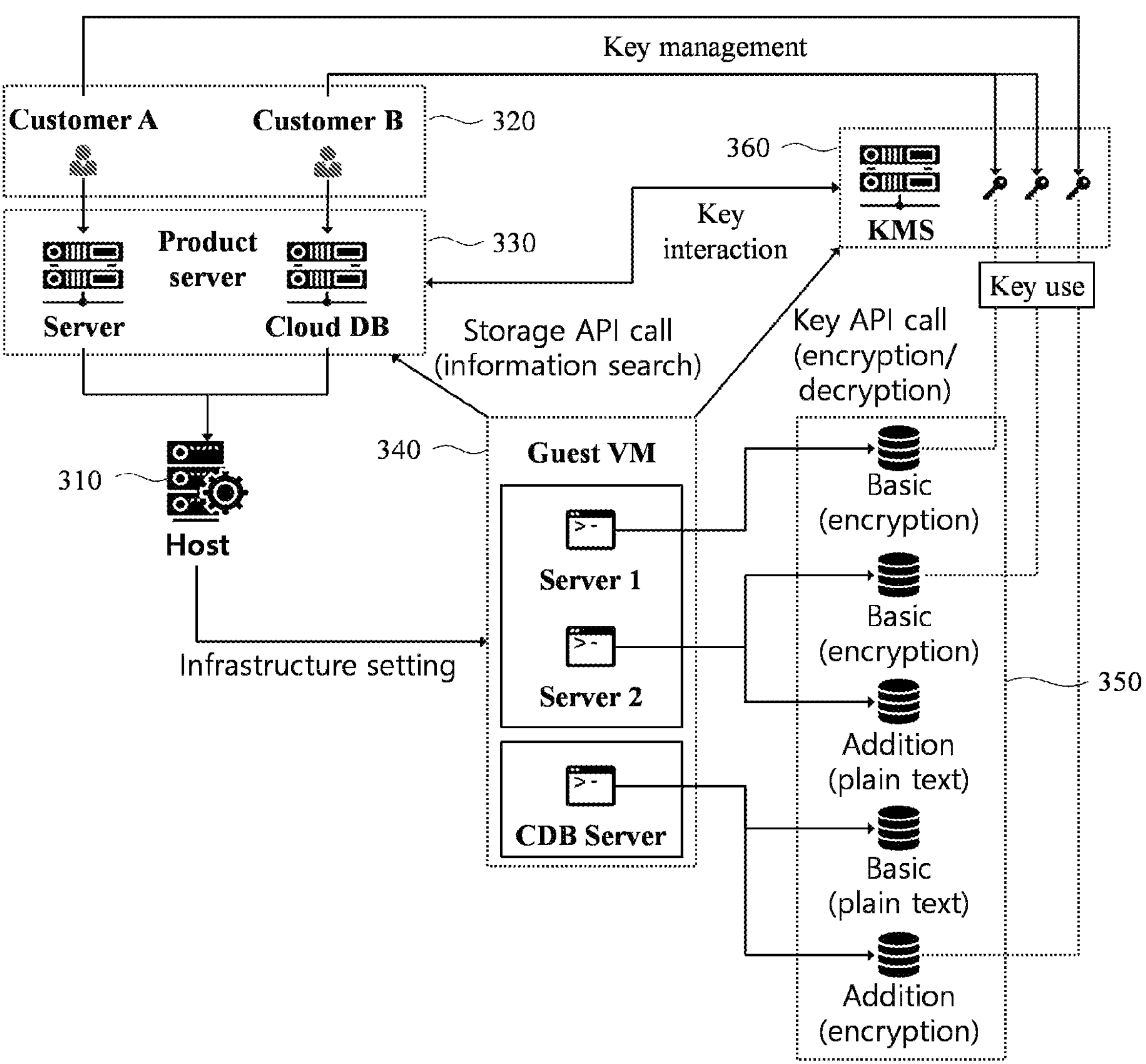
FIG. 3 illustrates a cloud environment in which data is stored using virtualization resources according to an example embodiment.

FIG. 3 illustrates a cloud environment in which data is stored using virtualization resources according to an example embodiment. Referring to FIG. 3, a host 310 may provide an infrastructure for providing virtual machines to customers 320, for example, customer A and customer B. For example, a guest virtual machine (VM) 340 may be generated as a virtualization resource to store data of a product server 330 for the customers 320. The guest VM 340 may retrieve data of the product server 330 through storage API call of the product server 330 and may store the data in a physical storage 350, and, here, may encrypt the retrieved data using keys of the customers 320 managed in a key management service (KMS) 360 and may store the encrypted data.

As described above, to apply Device Mapper (DM) encryption submodule (hereinafter, 'dm-crypt') and Linux™ Unified Key Setup (LUKS) techniques to a basic disk, for example, a booting disk, of a Linux™ system, existing data needs to be deleted from the disk. Therefore, it is typical to apply an encryption setting at a time of initially installing an operating system (OS).

According to the example embodiments, in the case of generating a virtual machine using a preset image, it is possible to dynamically apply an encryption setting for a virtual machine without deleting existing data in a booting process of loading a file system.

Figure 4:
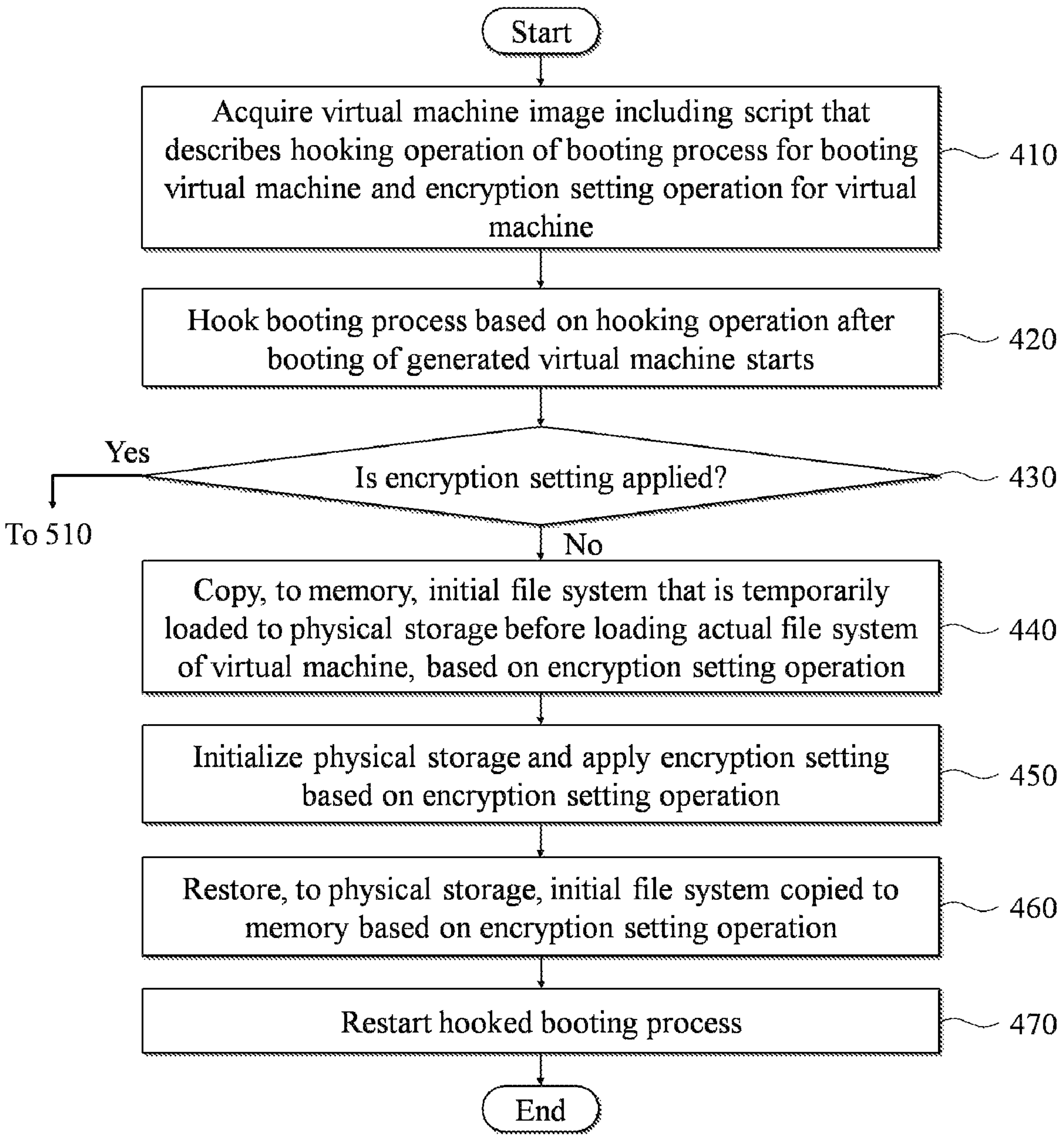
FIG. 4 is a flowchart illustrating an encryption setting application method according to an example embodiment.

FIG. 4 is a flowchart illustrating an encryption setting application method according to an example embodiment. The encryption setting application method of FIG. 4 may be performed by the computer apparatus 200 that implements a virtual machine. Here, the processor 220 of the computer apparatus 200 may be configured to execute a control instruction according to a code of at least one computer program or a code of an OS included in the memory 210. Here, the processor 220 may control the computer apparatus 200 to perform operations 410 to 470 included in the encryption setting application method of FIG. 4 in response to the control instruction provided from the code stored in the computer apparatus 200.

Referring to FIG. 4, in operation 410, the computer apparatus 200 may acquire a virtual machine image including a script that describes a hooking operation of a booting process for booting the virtual machine 340 and an encryption setting operation for the virtual machine 340. For example, the virtual machine image may be a template for efficiently and quickly generating a virtual machine, and may be generated through the host 310 and provided to the computer apparatus 200. Here, the script that describes the hooking operation may include a code for controlling the computer apparatus 200 to hook the booting process. Also, the script that describes the encryption setting operation may include a code for controlling the computer apparatus 200 to dynamically apply an encryption setting for encryption of data stored in the physical storage 350.

For example, when a Linux™ kernel is loaded to the memory 210, an init process is initially executed for kernel initialization. Here, an existing init process requires different implementation and/or setting for each distribution version of Linux™. Therefore, for consistency of Linux™ kernel initialization, an initial system called 'systemd' was born and introduced to most major Linux™ distribution versions. Here, a module or a service desired to execute at a time of booting, such as, for example, the hooking operation of the booting process and the encryption setting operation, may be generated as a shell script and may be included in the virtual machine image.

In operation 420, the computer apparatus 200 may hook the booting process based on the hooking operation after booting of the virtual machine 340 starts. As described above, the computer apparatus 200 may dynamically apply an encryption setting for encrypting data stored in the physical storage 350 through operations 430 to 460. For example, once booting of the virtual machine 340 starts, an init system called the aforementioned 'systemd' may be executed. In response to the execution of the hooking operation included in a form of the script, the booting process may be hooked.

In operation 430, the computer apparatus 200 may verify whether the encryption setting is applied to the generated virtual machine 340. Here, when the encryption setting is not applied to the generated virtual machine 340, the computer apparatus 200 may dynamically apply the encryption setting to the virtual machine 340 by performing operations 440 to 460 and may perform operation 470. On the contrary, when the encryption setting is applied to the generated virtual machine, the computer apparatus 200 may perform operation 470 after performing operations 510 and 520 of FIG. 5.

In operation 440, the computer apparatus 200 may copy, to the memory 210, an initial file system that is temporarily loaded to the physical storage 350 before loading an actual file system of the virtual machine, based on the encryption setting operation. The actual file system is a file system of the virtual machine 340, and the term "actual" is used to distinguish the actual file system from the initial file system. That is, the computer apparatus 200 may back up initially set data of the physical storage 350 that requires deletion of existing data in response to the application of the encryption setting.

One of the most important tasks of the init process of Linux™ is to load a kernel and to mount a root file system. A basic Linux™ file system may be compressed and loaded to the memory 210 at the time of booting the virtual machine. Here, the compressed basic file system refers to an initial file system (e.g., 'initramfs' (init ram file system)) and the purpose of the initial file system is to load the root file system.

In operation 450, the computer apparatus 200 may initialize the physical storage 350 and may apply the encryption setting based on the encryption setting operation. For example, the computer apparatus 200 may generate a key (hereinafter, a first key) to be used to encrypt data of the physical storage 350. Also, the computer apparatus 200 may construct a header of a Linux™ Unified Key Setup (LUKS) using the first key and may apply the LUKS to a system root, for example, '/sysroot' to be mounted as a partition. The computer apparatus 200 may generate a key file by encrypting the first key for encryption of data using a key (hereinafter, a second key) of a customer. Here, the term "customer" may represent an owner of the virtual machine. As an example, the customer may correspond to customer A or customer B shown in FIG. 3. The generated encrypted key file may be stored on a local storage of the computer apparatus 200, for example, on a'/boot' partition. Also, the computer apparatus 200 may back up the header of the LUKS and the key file. In this case, encrypted data of a corresponding device may be restored using the first key alone. Since the first key is encrypted using the second key that is a key of the customer, only the owner of the virtual machine may access data of the corresponding device.

To acquire the second key that is the key of the customer, the computer apparatus 200 may need to directly receive the second key from the customer or to receive the key of the customer through communication with the key management service 360 of FIG. 3. To this end, the virtual machine image may be generated to further include a code for a remote access function. For example, the code for the remote access function may include a script for executing a secure shell (SSH), a protocol that enables a safe remote access as one of network security tools. In this case, the computer apparatus 200 may acquire the second key that is the key of the customer through communication with the key management service 360 using an access control list (ACL) of a public key registration scheme through the secure shell.

In operation 460, the computer apparatus 200 may restore the initial file system copied to the memory 210 to the physical storage 350 based on the encryption setting operation. Once the initial file system is loaded to the memory 210, basic devices may be available through mapping to the file system. Subsequently, a kernel may be loaded to read information of data of an actual physical device and to generate and mount a root file system. Here, the basic devices and the actual physical device may refer to components of a computer apparatus 200.

In operation 470, the computer apparatus 200 may restart the hooked booting process for booting the virtual machine 340. For example, in response to execution of the init script, the init process may be performed. In the init process, a process such as a network activation process may be processed as a process of finishing process actual booting.

Figure 5:
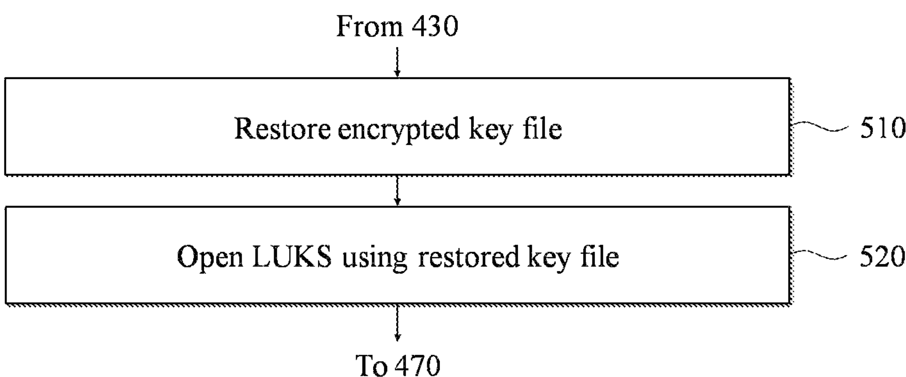
FIG. 5 is a flowchart illustrating a process when an encryption setting is applied to a generated virtual machine according to an example embodiment.

FIG. 5 is a flowchart illustrating a process when an encryption setting is applied to a generated virtual machine according to an example embodiment. Operations 510 and 520 of FIG. 5 may be performed by the computer apparatus 200 when it is determined in operation 430 that the encryption setting is applied to the virtual machine 340 generated.

Referring to FIG. 5, in operation 510, the computer apparatus 200 may restore the encrypted key file. For example, the computer apparatus 200 may restore the first key to be used to encrypt data by decrypting the key file stored on the local storage using the second key that is the key of the customer.

In operation 520, the computer apparatus 200 may open the LUKS using the restored key file. The computer apparatus 200 may restart the hooked booting process by performing operation 470.

Figure 6:
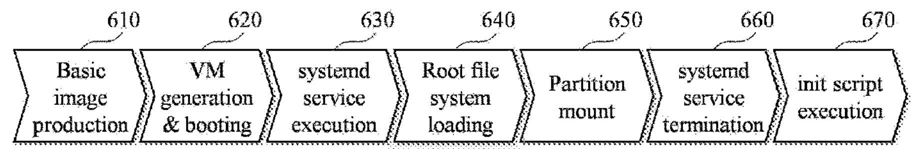
FIG. 6 illustrates a booting process of a virtual machine according to an example embodiment.

FIG. 6 illustrates a booting process of a virtual machine according to an example embodiment.

A basic image production 610 may be an example of a process in which the host 310 generates a basic image as a template for generating a virtual machine. For example, the host 310 may generate the basic image by adding, to an existing basic image, a package for an encryption setting, a package for SSH a 'systemd' module for setting and description and hooking of LUKS, and a command required for custom of 'initramfs'. For example, the script described in operation 410 of FIG. 4 may be included in the 'systemd' module that is the initial system module included in the virtual machine image to execute an initial system service for consistency of Linux™ kernel initialization. The generated basic image may be provided to a physical device, for example, the computer apparatus 200 that performs the operations 410 to 470 and operations 510 and 520 of FIGS. 4 and 5, in which the virtual machine 340 is to be generated. The basic image may correspond to the aforementioned virtual machine image.

A VM generation & booting 620 may be an example of a process in which the computer apparatus 200 generates and boots the virtual machine 340 based on the provided basic image.

A systemd service execution 630 may be an example of a process in which the computer apparatus 200 executes a systemd module added to the basic image. For example, the executed systemd module may execute the SSH using the package for SSH. Further description related to the SSH is made with reference to FIG. 7.

A root file system loading 640 may be an example of a process in which the computer apparatus 200 loads a root file system for the virtual machine 340. Here, if the virtual machine 340 requires encryption application, the computer apparatus 200 may execute process ① or ② of FIG. 6. For example, in response to an initial start of the virtual machine 340, the computer apparatus 200 may perform process ① if the encryption setting is not applied and may perform process ② if the encryption setting is applied.

In process ①, the computer apparatus 200 may start logging for applying the encryption setting (641-1) and may copy initramfs to the memory 210 (641-2). When operating an arbitrary system, it is necessary to record various information during operation in order to record and store the operating state of the system, to investigate the user's habits and to analyze the system operation. Making this record is called logging. That is, "logging" is to record a series of "events" related to the use of the arbitrary system over time. As described above, the basic Linux™ file system may be compressed and loaded to the memory 210 at a time of booting and the compressed basic file system refers to initramfs with the purpose of loading the root file system. Here, the computer apparatus 200 may generate a first key for encrypting data (641-3) and may apply LUKS to/sysroot to be mounted as a partition (641-4). Also, the computer apparatus 200 may store, on a local storage, a key file on encrypted by encrypting the first key generated using the key of the customer (641-5). The computer apparatus 200 may backup the LUKS header and the encrypted key file (641-6) and may terminate the logging for applying the encryption setting (641-7).

In process ②, the computer apparatus 200 may start logging (642-1) and may decrypt the encrypted key file using the key of the customer (642-2). The computer apparatus 200 may open the LUKS using the decrypted key file (642-3) and may terminate the logging (642-4).

A partition mount 650 may be an example of a process in which the computer apparatus 200 mounts the root file system. Here, the computer apparatus 200 may restore, to the physical storage 350, initramfs copied to the memory 210.

A systemd service termination 660 may be an example of a process of terminating the executed systemd module.

An init script execution 670 may be an example of finishing booting of the virtual machine 340 by executing the init process.

Figure 7:
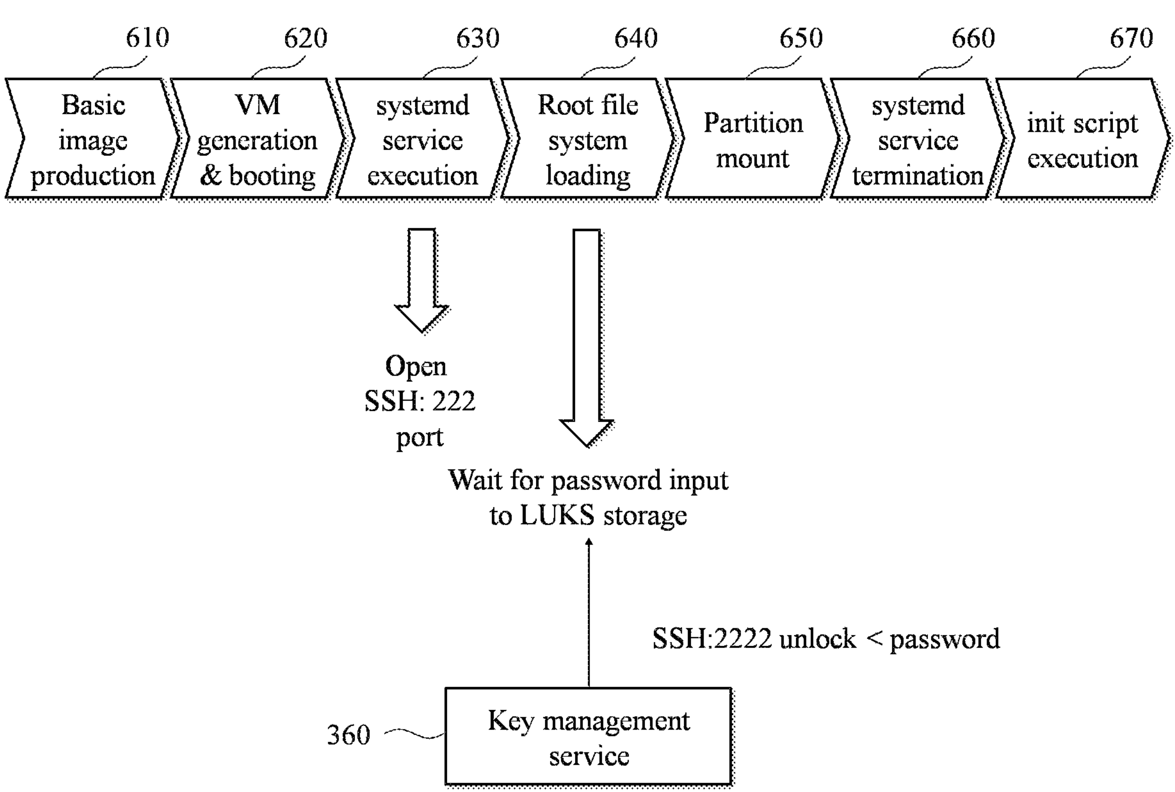
FIG. 7 illustrates a process of receiving a key of a customer according to an example embodiment.

FIG. 7 illustrates a process of receiving a key of a customer according to an example embodiment. As described above, the key of the customer is required to generate the key file by encrypting the first key or to acquire the first key by decrypting the encrypted key file. To acquire the key of the customer, a basic image may include a package for SSH and a systemd module may include a code for executing SSH. For example, the computer apparatus 200 may open a port for a network by executing the SSH through the systemd module in the systemd service execution 630 and may acquire the key of the customer by communicating with the key management service 360 through the open port in the root file system loading 640. In this case, the key management service 360 may verify resources of the virtual machine 340 and may transmit the key of the owner of the virtual machine 340 to the computer apparatus 200. Accordingly, the computer apparatus 200 may acquire the key of the customer and may encrypt or decrypt the first key.

According to example embodiments, when generating a virtual machine using a preset image, it is possible to dynamically apply an encryption setting for the virtual machine without deleting existing data in a booting process of loading a file system.

The systems and/or apparatuses described herein may be implemented using hardware components, software components, and/or a combination thereof. For example, hardware components may include a processing device which may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An encryption setting application method in a cloud environment including a host computer apparatus and physical storage, the method executed by at least one processor of the host computer apparatus and comprising:

acquiring a virtual machine image including a script that describes a hooking operation of a booting process for booting a virtual machine and an encryption setting operation for the virtual machine;

generating the virtual machine based on the virtual machine image;

booting the generated virtual machine based on the booting process;

hooking the booting process based on the hooking operation after booting of the virtual machine starts;

verifying whether the encryption setting is applied to the generated virtual machine, and when the encryption setting is not applied to the generated virtual machine, applying the encryption setting to the generated virtual machine by performing the following steps:

copying, to a memory included in the host computer apparatus, an initial file system temporarily loaded to the physical storage corresponding to the virtual machine to back up an initial setting of the physical storage associated with the initial file system;

loading an actual file system of the virtual machine, after copying to the memory, the initial file system temporarily loaded to the physical storage;

initializing the physical storage, after loading the actual file system, and applying the encryption setting to the physical storage to encrypt data of the physical storage; and restoring the initial file system copied to the memory so that the initial setting of the physical storage is restored; and restarting the hooked booting process for booting the generated virtual machine.

2. The method of claim 1, wherein the initializing of the physical storage and the applying of the encryption setting comprises:

generating a first key to be used to encrypt data of the physical storage;

generating a key file by encrypting the first key using a second key of an owner of the virtual machine; and storing the generated key file on a local storage.

3. The method of claim 2, wherein the applying of the encryption setting to the virtual machine comprises:

in response to the encryption setting being already applied to the virtual machine, decrypting the key file using the second key of the owner of the virtual machine.

4. The method of claim 1, wherein the virtual machine image further comprises a code for a remote access function, and the method further comprises:

setting communication with a key management service that manages a key of an owner of the virtual machine based on the remote access function.

5. The method of claim 4, wherein the applying of the encryption setting to the virtual machine comprises acquiring the key of the owner from the key management service.

6. The method of claim 4, wherein the setting of the communication with the key management service comprises using an access control list (ACL) of a secure shell (SSH)-based public key registration scheme based on the remote access function.

7. A non-transitory computer-readable recording medium storing instructions that, when executed by a processor of a host computer apparatus, cause the processor to perform the encryption setting application method comprising:

acquiring a virtual machine image including a script that describes a hooking operation of a booting process for booting a virtual machine and an encryption setting operation for the virtual machine;

generating the virtual machine based on the virtual machine image;

booting the generated virtual machine based on the booting process;

hooking the booting process based on the hooking operation after booting of the virtual machine starts;

verifying whether the encryption setting is applied to the generated virtual machine, and when the encryption setting is not applied to the generated virtual machine, applying the encryption setting to the generated virtual machine by performing the following steps:

copying, to a memory included in the host computer apparatus, an initial file system temporarily loaded to a physical storage corresponding to the virtual machine to back up an initial setting of the physical storage associated with the initial file system;

loading an actual file system of the virtual machine, after copying to the memory, the initial file system temporarily loaded to the physical storage;

initializing the physical storage, after loading the actual file system, and applying the encryption setting to the physical storage to encrypt data of the physical storage; and restoring the initial file system copied to the memory so that the initial setting of the physical storage is restored; and restarting the hooked booting process for booting the virtual machine.

8. A host computer apparatus comprising: at least one processor configured to execute computer-readable instructions, wherein the at least one processor is configured to:

acquire a virtual machine image including a script that describes a hooking operation of a booting process for booting a virtual machine and an encryption setting operation for the virtual machine, generate the virtual machine based on the virtual machine image;

boot the generated virtual machine based on the booting process;

hook the booting process based on the hooking operation after booting of the virtual machine starts, verifying whether the encryption setting is applied to the generated virtual machine, and when the encryption setting is not applied to the generated virtual machine, applying the encryption setting to the generated virtual machine by performing the following steps:

copying, to a memory included in the host computer apparatus, an initial file system temporarily loaded to a physical storage corresponding to the virtual machine to back up an initial setting of the physical storage associated with the initial file system;

loading an actual file system of the virtual machine, after copying to the memory, the initial file system temporarily loaded to the physical storage;

initializing the physical storage, after loading the actual file system, and applying the encryption setting to the physical storage to encrypt data of the physical storage; and restoring the initial file system copied to the memory so that the initial setting of the physical storage is restored, and restart the hooked booting process for booting the virtual machine.

9. The host computer apparatus of claim 8, wherein the at least one processor is further configured to generate a first key to be used to encrypt data of the physical storage, generate a key file by encrypting the first key using a second key of an owner of the virtual machine, and store the generated key file on a local storage.

10. The host computer apparatus of claim 8, wherein the virtual machine image further comprises a code for a remote access function, and the at least one processor is further configured to set communication with a key management service that manages a key of an owner of the virtual machine based on the remote access function.

11. The host computer apparatus of claim 10, wherein the at least one processor is further configured to acquire the key of the owner from the key management service.

* * * * *